United States Patent [19]
Alt

[11] 3,901,686
[45] Aug. 26, 1975

[54] 1-NAPHTHOIC ACID, 2,2-DIMETHYLHYDRAZIDE

[76] Inventor: Gerhard H. Alt, Creve Coeur, Mo.

[22] Filed: Aug. 29, 1974

[21] Appl. No.: 501,556

Related U.S. Application Data

[62] Division of Ser. No. 365,336, May 30, 1973, Pat. No. 3,855,289.

[52] U.S. Cl. ............................... 71/118; 71/78
[51] Int. Cl.² ........................................ A01N 9/20
[58] Field of Search ................................ 71/118

[56] References Cited
UNITED STATES PATENTS
3,502,685   3/1970   Gevirtz et al. .................. 71/118

*Primary Examiner*—Elbert L. Roberts
*Assistant Examiner*—Catherine L. Mills
*Attorney, Agent, or Firm*—Richard H. Shear

[57] ABSTRACT

1-Naphthoic acid, 2,2-dimethylhydrazide is prepared and demonstrates useful regulation of plant growth when applied to viable plants.

9 Claims, No Drawings

1-NAPHTHOIC ACID, 2,2-DIMETHYLHYDRAZIDE

BACKGROUND OF THE INVENTION

This is a division, of application Ser. No. 365,336, filed May 30, 1973 now U.S. Pat. No. 3,855,289.

This invention relates to a novel hydrazine derivative and to a method for regulating the natural growth or development of plants using said derivative. The compound of this invention is a plant regulator which is defined by Congress in Public Law 92-516, the Federal Environmental Pesticide Control Act of 1972, section 2, subsection v, as any substance or mixture of substances intended through physiological action, for accelerating or retarding the rate of growth or rate of maturation, or for otherwise altering the behavior of plants or the produce thereof, but shall not include substances to the extent that they are intended as plant nutrients, trace elements, nutritional chemicals, plant inoculants, and soil amendments. In view of the ever increasing demand for plant products due to the rapid expansion of the world population, considerable research has been conducted to find chemical substances which can be beneficially utilized as plant regulators, such as, agents which retard vegetative growth or are useful for optimizing the yields of various crops.

Various hydrazine derivatives are known. For example, U.S. Pat. No. 3,305,347 is directed to a class of benzylidine hydrazines useful as pesticides. U.S. Pat. No. 3,240,799 and U.S. Pat. No. 3,334,991 are directed to classes of hydrazine derivatives useful for the regulation of plant growth. Further classes of hydrazine derivatives are described in pending U.S. application Ser. Nos. 214,382 and 214,383 both filed Dec. 30, 1971 by G. H. Alt which are useful as herbicides.

BRIEF SUMMARY OF THE INVENTION

An embodiment of this invention is the novel compound 1-naphthoic acid, 2,2-dimethylhydrazide. This compound is represented as follows:

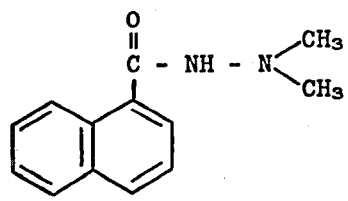

An alternative name for the compound of this invention is 1-(1-naphthoyl)-2,2-dimethylhydrazine.

The compound of this invention can be prepared by the reaction of 1-naphthoyl chloride and 1,1-dimethyl hydrazine using procedures well known to those skilled in the art. Generally, the reaction is carried out in the presence of an inert solvent. The reaction being exothermic is conducted with cooling and the stepwise addition of the naphthoyl chloride in order to maintain the reaction temperature below the boiling point of the solvent employed. Further details of the preparation of the compound of this invention are found in Example I.

Another embodiment of this invention is the method of regulating the natural growth or development of plants which comprises applying to the plant an effective plant regulating amount of 1-naphthoic acid, 2,2-dimethylhydrazide.

A further embodiment of this invention is plant growth regulating compositions comprising an effective plant growth regulating amount of 1-naphthoic acid, 2,2-dimethylhydrazide and an adjuvant, such as, a surfactant.

DESCRIPTION OF THE INVENTION

In accordance with this invention a method is provided whereby viable plants are treated with a chemical substance which alters their natural growth or development to enhance the various agricultural or horticultural features of the plants. As employed herein, the term "natural growth or development" designates the normal life cycle of the plant in accordance with its genetics and its environment, in the absence of artificial, external influences.

The method of regulating plant growth provided by this invention is particularly useful for treating dicotyledonous plants to modify the vegetative growth, the flowering of fruit set or to optimize the yield. Representative crop plants which can be treated with the compounds of this invention are, for example, soybean (Glycine), cotton (Gossypium), beans (Phaseolus), coffee (Coffea), tomato (Lycopersicon) and the like, which often do not obtain their yield capacity due to premature blossom drop or because of failure of the fruit to set.

For convenience, the term "active ingredient" will be used hereinafter to connote 1-naphthoic acid, 2,2-dimethylhydrazide.

It is to be understood that the regulation of natural growth and development does not include killing or herbicidal action. Although phytotoxic or lethal amounts of the active ingredient might be employed to destroy certain plants, it is comtemplated here to employ only such amounts of said active ingredient as will serve to regulate the natural growth and development of useful plants without substantial injury. As may be expected and as long understood by those skilled in the art, such effective plant regulating amounts will vary with the regulatory effect to be achieved, the species of plant being treated and its stage of development, and whether a permanent or transient regulating effect is sought. Other factors which may bear upon the determination of an appropriate plant regulating amount include the plant growth medium, the manner in which the treatment is to be applied, weather conditions such as temperature or rainfall, and the like.

In accordance with the instant invention it has been found that desirable regulation of natural plant growth or development is achieved by application of the active ingredient to plants in various stages of development. Accordingly, in the practice of this invention the active ingredient can be applied to the plant in the seedling stage, flowering stage or fruiting stage and the like or can be applied sequentially to plants at more than one stage of development. Such application may be made directly to one or more of the plant's parts, such as stems, leaves, flowers, fruit or the like or to the plant's habitat. Generally, the application is made by spraying the plants using conventional techniques.

Regulation of the natural growth or development of plants by chemical treatment results from the effect of the chemical substance on the physiological processes of the plant and the effect of such substance may be manifested by the morphology of the plant. As should be readily apparent, said regulation may also result from a combined or sequential effect of the chemical manifesting a response in both physiology and morphology.

In general, regulation of the natural growth or development which leads to a morphological change in the plant is readily noticeable by visual observation. Such changes can be found in the size, shape, color or texture of the treated plant or any of its parts. Similarly, changes in the quantity of plant fruit or flowers can be simply noted.

On the other hand, regulation which leads to changes only in the physiological processes occur within the treated plant and are usually hidden from the eye of an observer. Changes of this type are most often in the production, location, storage or use of naturally occurring chemicals, including hormones, within the plant. Physiological changes in a plant often are recognized when followed by a subsequent change in morphology. Additionally, there are numerous analytical procedures known to those skilled in the art for determining the nature and magnitude of changes in the various physiological processes.

The compound of the instant invention serves to regulate the natural growth or development of treated plants in a number of diverse ways and it is to be understood that the compound may not produce identical regulatory effects on each plant species or at every rate of application. As stated above, responses will vary in accordance with the rate, the plant, etc.

A regulatory response demonstrated by the compound useful in the practice of this invention can be generally termed retardation of vegetative growth and such a response may be transitory and is indicative of beneficial plant growth modification. In certain plants this retardation of vegetative growth causes an interruption of apical dominance leading to increased lateral branching. This regulation of the natural growth or development of plants produces plants which are in a good state of health and tends to produce more effective plants.

As illustrated in the treatments hereinafter presented, the compound of this invention regulates the natural growth or development of treated dicotyledonous plants in numerous other and different respects. Included among these other regulatory effects are the inducing of axillary bud development, the delay or acceleration of fruit or pod set, etc. Although regulatory effects such as those described above can be desirable, often it is the ultimate result of these effects upon the economic factor which is of primary significance in crop plants or upon the aesthetic factor in ornamental plants. Thus, it must be recognized that increases in yield of individual plants, increases in the yield per unit of cropping area, improvement in the quality of the plants' product, improvement in the plants vigor and reductions in the cost of harvesting and/or subsequent processing are all to be considered in any assessment of the consequence of an individual regulatory effect during the growth or development of a plant.

The practice of the method of this invention is particularly useful for improving the efficiency of dicotyledonous row crops such as tomato (Lycopersicon). The application of the compound of this invention to such growing crop plants often improves the crop yield without substantial injury. In this manner the plant's efficiency of production is improved and a means is provided for optimizing the crop by treating said crop with the active ingredient during its growing stage.

In selecting the appropriate nonherbicidal rate of application of the active ingredient, it will be recognized that precise dosages will be dependent upon the plant species being treated, the particular plant part or habitat to which application is made, the development stage of the plant, the mode of application and various other factors known to those skilled in the art. In foliar treatment for the regulation of plant growth, the active ingredient is applied in amounts from about 0.05 to about 10 or more pounds per acre. Foliar applications of from 0.1 to 5 pounds of the active ingredient per acre are preferred. In applications to the soil habitat or the plants the active ingredients are applied in amounts of from about 0.1 to about 20 pounds per acre or more. Preferably, the active ingredients are applied to the soil at a rate of from 1 to 10 pounds per acre. Foliar application to plants at the blooming stage, e.g., 10% blossoms, are particularly advantageous and are preferred.

Preparation of 1-Naphthoic Acid, 2,2-Dimethylhydrazide

The compound of this invention can be prepared by the exothermic reaction of 1-naphthoyl chloride with 1,1-dimethylhydrazine in accordance with the following scheme:

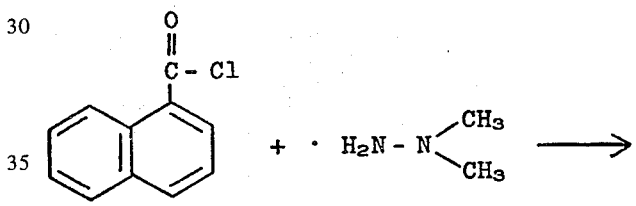

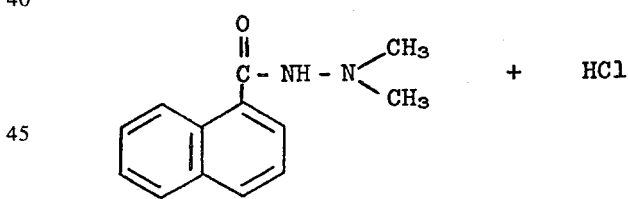

For convenience, the reaction can be conducted using twice the stoichiometric amount of the hydrazine which acts as a scavenger for the by-product HCl. Further details of the preparation of the compound are found in the following nonlimiting example.

EXAMPLE I

To a suitable vessel charged with about 24.0 g. of 1,1-dimethyl hydrazine (0.4 mole) mixed with 90 ml of benzene is added, dropwise with stirring and cooling, about 38.1 g. of 1-naphthoyl chloride (0.2 mole) diluted with 90 ml of benzene. The reaction being exothermic is conducted in an ice bath, maintaining the temperature below about 35°C. After the addition is complete, the reaction mixture is stirred at room temperature for about 3 hours then poured into about 200 ml of water and filtered under vacuo to yield a white solid which upon recrystallization from ethyl acetate-petroleum ether provides 1-naphthoic acid, 2,2-dimethylhydrazide, a white solid having a melting point of 142°–144°C. Identity of the product is confirmed by NMR and IR spectral analysis and by elemental analysis.

| Calcd. for $C_{13}H_{14}N_2O$: | C, 72.87; | H, 6.59; | N, 13.08. |
|---|---|---|---|
| Found: | C, 72.71; | H, 6.60; | N, 12.95. |

Plant Growth Regulating Compositions

Another embodiment of this invention is a plant growth regulating composition comprising an adjuvant and an effective plant growth regulating amount of 1-naphthoic acid, 2,2-dimethylhydrazide.

The plant growth regulating compositions are particularly effective for practicing the method of regulating the natural growth or development of plants provided by this invention. In view of the activity of the active ingredient at low rates of application, it is desirable to use compositions comprising an effective amount of the active ingredient and an adjuvant to facilitate a uniform distribution of the compound on the plants. Adjuvant, as used herein, includes one or more materials in liquid or solid form. Thus, suitable adjuvants are extenders, carriers, surfactants, adhesive agents, foaming agents, conditioning agents, solvents and, usually, combinations thereof. The compositions can be in numerous forms, such as, dusts, powders, wettable powders, granules, solutions, foams, aerosols, dispersions or emulsions. Generally, it is preferred to use one or more surfactants in the plant growth regulating compositions which aid in wetting the treated plant surface. Further, suitable surfactants provide stable dispersions of the active ingredient in various inert carriers or diluents in the composition or added to the composition prior to application to the plants. Suitable surfactants which can be employed in the compositions of this invention are well known surface active agents, such as, wetting agents, emulsifiers, dispersing agents and can be non-ionic, anionic or cationic. Preferred surfactants are the nonionic or the anionic type which are widely used in compositions employed in agronomic treatments. Representative nonionic surfactants are polyoxyethylene esters of fatty acids, octylphenyl polyethylene glycol ethers, polyoxyethylene derivatives of long-chain alcohols and the like. Representative anionic surfactants are alkali and alkaline earth salts of alkylarylsulfonic acids such as sodium lauryl sulfonate, dialkyl sodium sulfosuccinate esters and the like. Such surfactants are well known and reference is made to U.S. Pat. No. 2,547,724 for detailed examples of same.

Usually the plant growth-regulating compositions of this invention take the form of a concentrate which can be readily extended with an inert carrier prior to application to the plants. Said concentrates in liquid form consist of solvent, surfactant and about 25 to 75% by weight of the active ingredient. These liquid concentrates can be diluted with water to provide a composition, suitable for application to plants, which contains from about 0.1 to about 15% by weight of the active ingredient. Concentrates in solid form are, for example, wettable powders consisting of finely divided solids such as calcium silicate, surfactant and from about 5 to 80% or more by weight of the active ingredient which may be diluted with water prior to applying to the plants.

A representative plant growth regulating composition in the form of a concentrate in solid form is set forth below.

EXAMPLE II

The following ingredients are thoroughly blended and milled to produce a free flowing powder having good wetting properties.

| Ingredient | Wt. Percent |
|---|---|
| Kaolin | 42 |
| Sodium N-methyl-N-oleoyl-taurate[a] (28% active) | 4 |
| Sulfonated lignin derivative[b] | 4 |
| 1-Naphthoic acid, 2,2-dimethyl-hydrazide | 50 |
| [a]IGEPON T-73, GAF Corp. | |
| [b]REAX-45-A, Westvaco Corp. | |

Plant Growth Regulating Evaluations

The useful and unexpected plant growth regulating properties of 1-naphthoic acid, 2,2-dimethylhydrazide are demonstrated by exemplary tests set forth below as Test A. In the following Tests A and B the chemical was applied as an aqueous composition at the equivalent rate of active ingredient indicated. The aqueous compositions were prepared by solubilizing the required amount of the chemical in a volume of acetone which is further admixed with a like volume of 0.5% by weight aqueous solution of polysorbitan monolaurate (Tween 20 surfactant), to provide sufficient composition which is applied at the rate equivalent to 200 gallons per acre to apply the chemical at the equivalent rate indicated.

Test A

A number of soybean plants, representative of dicotyledonous plants, are grown from seed in aluminum pans in a greenhouse for a period of approximately one week to the primary leaf stage. The plants are thinned to three uniform plants in each pan and the height of each plant is measured to the terminal bud and the average height is noted. One pan containing three soybean plants is used for each chemical treatment and four pans are not treated and used as a control. The aqueous composition of the chemical is then applied to the pan of growing plants by overhead spray at an established rate expressed as pounds per acre. The treated pans along with the control pans are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25% or more in the development of at least two-thirds of the treated plants when compared to the development of the control plants demonstrates that the chemical is effective for regulating the natural growth or development of the plants. Accordingly, a chemical is considered effective when the treated plants manifest at least a 25% decrease in height development when compared to the untreated control plants, i.e., retardation of vegetative growth.

Using the procedure of Test A, retardation of vegetative growth in excess of 25% was obtained with the compound of this invention at a rate equivalent to 5 pounds per acre.

Test B

In this evaluation soybean plants growing in individual pots which were 4 weeks old (3-4 trifoliate stage) were used for each application of the chemical. An overhead spray of the aqueous composition of the chemical is applied to 2 pots at an equivalent rate as indicated below. Two to four sets of plants which receive no chemical application are included and serve as controls. All of the pots are maintained under good growing conditions and are watered and are uniformly fertilized under uniform conditions. Two weeks after the application of the chemical the growth responses of the treated plants are compared with that of the control plants. The total height of the plant is measured to the tip of the terminal bud. A decrease of 15% or more in the average total height of the treated plants, when compared to that of the control plants, demonstrates that the chemical is effective for regulating the natural growth or development of the plants. In addition to this retardation of vegetative growth, other observations indicating a morphological response in the plants treated with the chemical of this invention were noted.

Employing the procedure of Test B, 1-naphthoic acid 2,2-dimethylhydrazide was effective in reducing the total height of the plant in excess of 15% at rates of application equivalent to 5 pounds and to 2.5 pounds per acre to the four week old plants. The plants treated at the 5 pounds per acre rate also demonstrated distortion of the leaves and a type of rosette growth.

Five soybean plants, planted at the rate of 9 seeds per foot in 30 inch rows, gorwing under field conditions, were treated with 1-naphthoic acid, 2,2-dimethylhydrazide solution at a rate equivalent to about 1.0 and 3.5 pounds per acre using a 50:50 mixture of acetone and water containaing 0.05% of dioctyl ester of sodium sulfosuccinic acid, surfactant (Aerosol OT, American Cyanamide Co.). Each treatment was duplicated and compared to untreated control plants growing under the same conditions. At the time of treatment the plants were beginning to flower (about 10% blooms). When compared to the controls at harvest the plants treated at a rate equivalent to about 3.5 pounds per acre demonstrated improved seed yield and improved number of pods with a slight improvement in seed size. The 1 pound per acre treatment showed only very slight improvement in seed yield and number of pods and the plants were substantially equivalent to the control plants.

Tomato plants, variety Surprise an indeterminate type, growing in individual pots under greenhouse conditions were treated with a water suspension of the wettable powder of Example II at a rate equivalent to 0.5, 1 and 4 pounds of active ingredient per acre. Each treatment was replicated 3 times and applied as a foliage spray when the plants had the first flower cluster about 2-4 days prior to flowering. About 10 days after treatment the flowers of all plants were vibrated to initiate fruit set required under greenhouse conditions. Approximately 23 days after treatment the treated plants were compared to the untreated control plants for fruit yeild as follows:

Number of Fruit

| Treatment | 1st Cluster | 2nd Cluster | 3rd Cluster | Total | Total Wt. of Fruit |
|---|---|---|---|---|---|
| Control* | 2.8 | 3.7 | 0.2 | 6.7 | 112.0 |
| 0.5** | 2.3 | 3.7 | 0 | 6.0 | 126.7 |
| 1** | 2.7 | 2.7 | 0.7 | 6.1 | 134.0 |
| 4** | 3.3 | 3.3 | 0 | 6.6 | 150.0 |

*Average of 6 plants.
**Average of 3 plants.

The above results demonstrate that under greenhouse conditions the total weight of the fruit from the treated plants was greater than the control at all treatment rates while the total number of fruit was not substantially changed. The four pound per acre treatment showed the most improvement in fruit yield under these conditions.

Numerous field plots of various soybean varieties planted at various row spacings and population densities were treated when the plants were beginning to bloom with a water suspension of the composition of Example II at rates equivalent to 1 to 2 pounds per acre. At harvest the treated plants were compared to untreated control plants growing under the same conditions. Although not all the varieties and cultural systems, row spacing and population densities, responded in the same manner, generally no damage or morphological changes were noted and a slight improvement in seed yield was obtained, usually the highest improvement in seed yield was with the 2 pounds per acre rate of application.

Field plots of tomato plants, variety C-28, a determinate processing type, were treated when the second flower cluster was formed but not open with a water suspension of the composition of Example II at rates equivalent to 1 and 3 pounds per acre of active ingredient applied at a rate equivalent to 30 gallons of suspension per acre. Each treatment was replicated four times as well as untreated plots of like plants which served as control for comparison purposes. Approximately 8 weeks after treatment the plots were harvested and the treated plants were compared to the control plants. Neither treatment resulted in any appreciable morphological change in the plants and the height of the treated plants was substantially the same as the control plants. The tomato yield from each treatment was analyzed by weight and number and compared to the control for number of fruit per plant, weight per fruit and weight yield per plant using three plants randomly selected from each replicate. Using the averages of the four replicates, the 3 pounds per acre treatment demonstrated about 13% improvement in number per plant, about 13% improvement in fruit size and about 26% improvement in yield per plant. The 1 pound per acre treatment provided a very slight decrease in number per plant, about a 9% increase in fruit size and about 8% increase in yield per plant. Thus, the 3 pounds per acre rate of application of the compound to tomato plants was the most effective in improving the yield of the plants in this evaluation.

In utilizing the methods and compositions of this invention, it is often advantageous to treat dicotyledonous crops which are beginning to blossom in order to elicit a growth response to optimize the plant's efficiency in producing fruit.

The methods of this invention can be conveniently carried out in conjunction with agronomic practices such as treating the plants with insecticides, fungicides, fertilizers and the like. The application of compositions containing 1-napthoic acid, 2,2-dimethylhydrazide and other agricultural chemicals such as selective herbicides, insecticides, fungicides, fertilizers, nematocides and the like are particularly advantageous for obtaining the desired results with minimum treatment costs.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A method of regulating the natural growth or development of dicotyledonous plants which comprises applying to said plant an effective growth regulating amount of 1-naphthoic acid, 2,2-dimethylhydrazide.

2. The method of claim 1 wherein the plants are field crops.

3. The method of claim 1 wherein the plants are tomato.

4. The method of claim 1 wherein the plants are soybean.

5. The method of claim 1 wherein the plants are cotton.

6. The method of claim 1 wherein the application is made to plants beginning to blossom.

7. A plant growth regulating composition comprising an effective amount of 1-naphthoic acid, 2,2-dimethylhydrazide and a surfactant.

8. The composition of claim 7 which contains from about 5 to 80% by weight of 1-naphthoic acid, 2,2-dimethylhydrazide.

9. The composition of claim 7 in the form of a wettable powder containing a finely divided solid carrier.

* * * * *